(No Model.)  2 Sheets—Sheet 1.
H. J. HAIGHT.
THERMOSCOPE.
No. 302,908.  Patented Aug. 5, 1884.
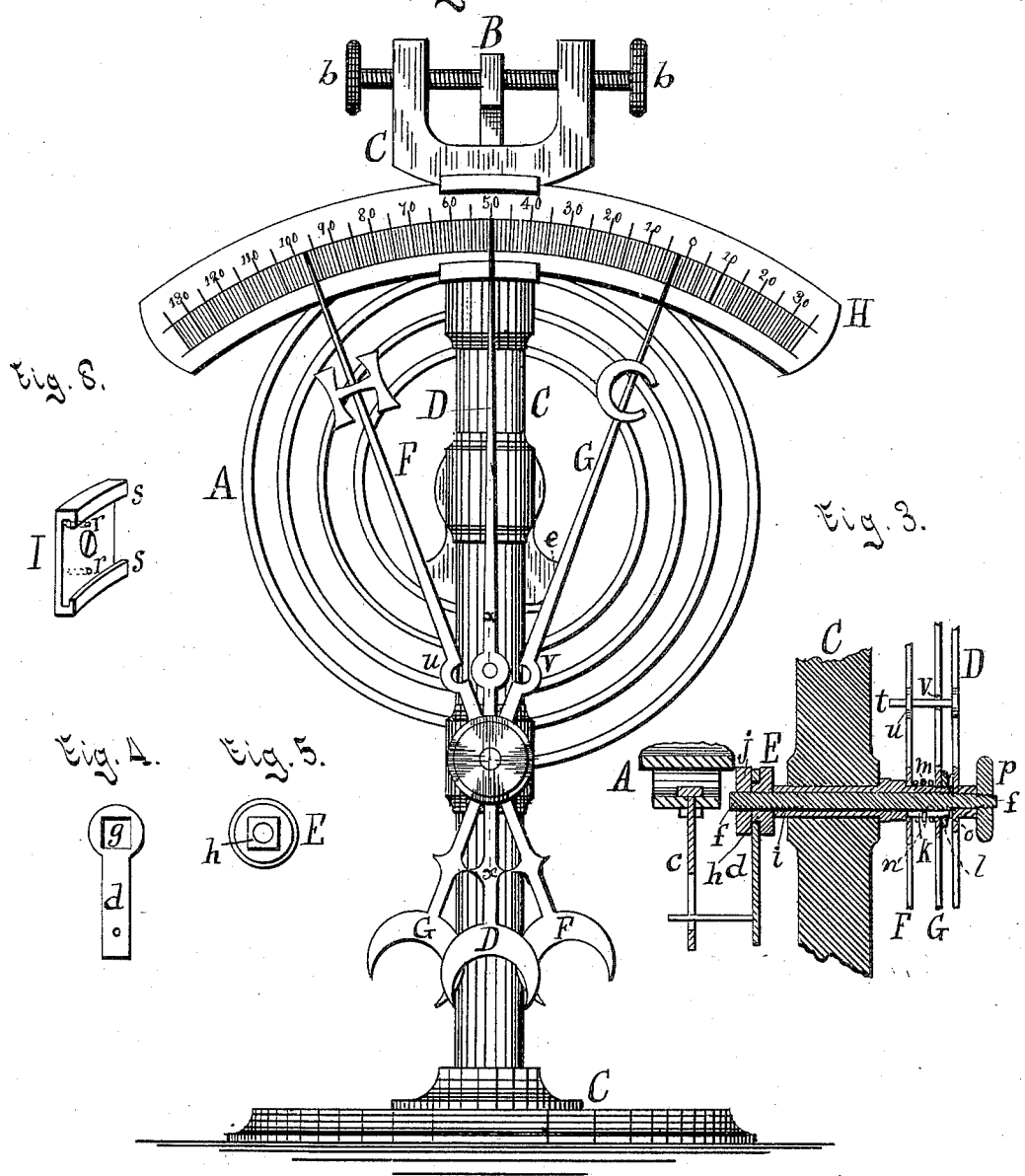
Witnesses.
J. W. Lane
A. S. Brown
Inventor.
Henry J. Haight.
By his Attorney, A. S. Brown

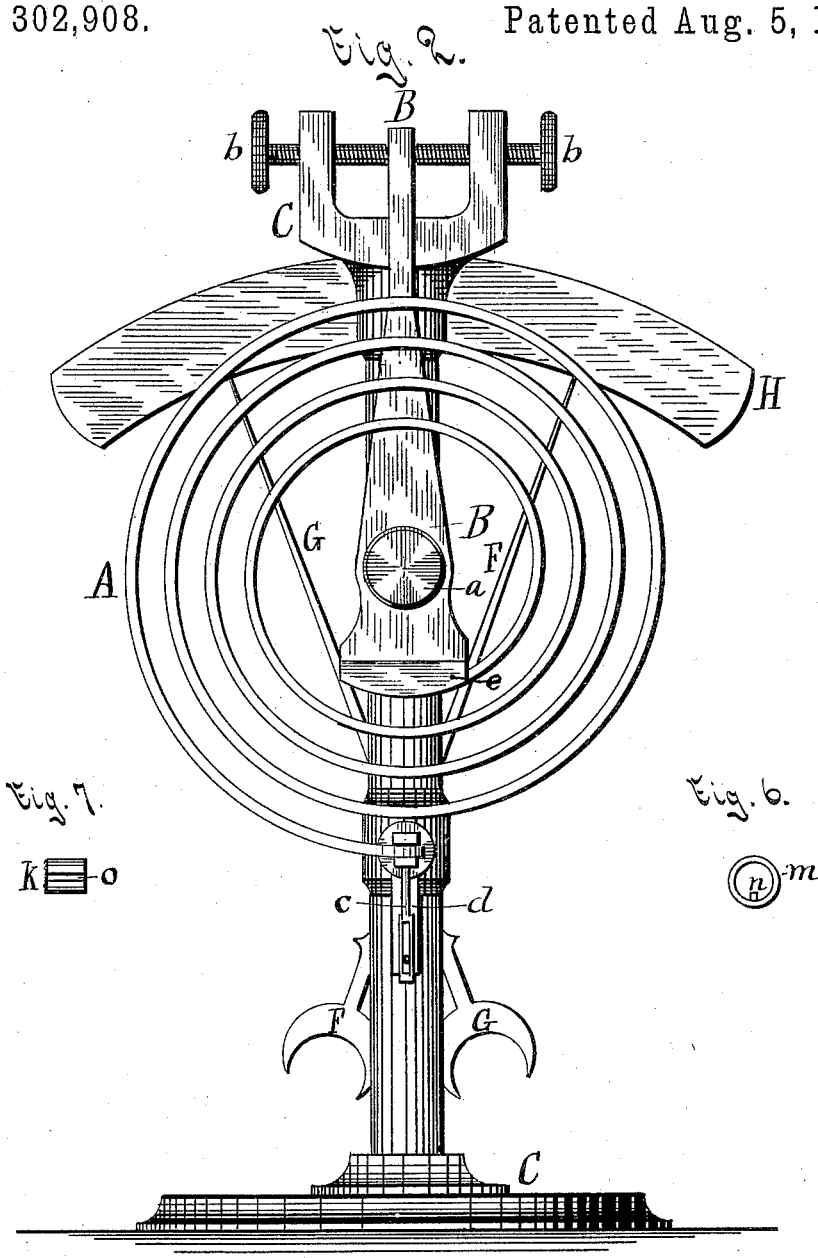

UNITED STATES PATENT OFFICE.

HENRY J. HAIGHT, OF NEW YORK, N. Y.

THERMOSCOPE.

SPECIFICATION forming part of Letters Patent No. 302,908, dated August 5, 1884.

Application filed November 2, 1883. (No model.)

*To all whom it may concern:*

Be it known that I, HENRY J. HAIGHT, of the city, county, and State of New York, have invented an Improved Thermoscope; and I do hereby declare that the following is a full and exact description thereof, reference being had to the accompanying drawings, making part of this specification, in which—

Figure 1 is a front view of the thermoscope; Fig. 2, a rear view of the same; Fig. 3, a section in a plane indicated by the line $xx$, Fig. 1, and Figs. 4, 5, 6, 7, and 8 views of parts detached.

Like letters designate corresponding parts in all of the figures.

My improved thermoscope indicates the warmest and coldest temperature within stated intervals, and also the temperature at the time of observation, being both a thermoscope and a thermometer. For this purpose I employ a thermostatic coil, preferably such as described in my Letters Patent of December 12, 1882, No. 268,885. I mount the inner end of this coil A on an arm, B, which I term a "radial arm," that is pivoted upon a pin, $a$, projecting from a supporting-stand, C, at a proper distance from the upper end thereof. The coil is secured to the radial arm at a suitable distance below the pivot, being directly attached to an outwardly-horizontally projecting lug or projection, $e$, on the lower end of the said arm, so that the coil has free room independent of the length of the arm; and the upper end of the arm is placed between two oppositely-arranged thumb-screws, $b$ $b$, by which the position of the radial arm is adjusted. This adjustment is on a similar principle to that for regulating a thermostat-coil described in my Letters Patent dated December 27, 1881, No. 251,359, which, however, had no radial arm bearing the coil; and the adjustment in that former invention was for a different purpose—namely, to determine the normal degree of heat in a chamber—while the present adjustment is for regulating the instrument by a standard thermometer. On the movable end of the coil is a finger, $c$, coupled to an arm, $d$, projecting from a rock-shaft, $f$, which bears the main index D in a manner similar to the corresponding parts of the said Letters Patent. The arm $d$, Fig. 3, has a square or equivalent eye, which couples it immovably to the rock-shaft $f$; or, as shown in the drawings, the square eye $g$, Fig. 4, of the arm fits over a square projection, $h$, Fig. 5, on a nut, E, which screws upon the said shaft, which is mounted in an extended bearing or sleeve, $i$, attached to or formed with the standard of the supporting-stand. The arm $d$ is held in place by a nut, $j$, screwed upon the shaft $f$. Around this shaft and fitting in the said bearing is a tubular projection, $k$, on which are mounted the two thermoscope indexes or hands F G, which indicate the extremes of heat and cold to which the thermoscope has been subjected within the time since the last previous observation. On the outer screw-threaded end of the projection $k$ a nut, $l$, is screwed to hold the two hands F G on the tubular projection $k$, around which they turn freely; but to retain these hands in any position to which they may be moved a coiled spring, $m$, Fig. 6, is interposed around the said tubular projection $k$ between the two hands, and is compressed sufficiently to retain them in position, but not offer much resistance to any force tending to turn them on the tubular projection. To insure the holding of one hand in its position while the other hand is moving, the coiled spring $m$ is itself prevented from turning by having a little projection or spline, $n$, Fig. 6, on the inside, arranged to fit in a longitudinal groove, $o$, Fig. 7, in the tubular projection $k$. The hands themselves are balanced on the said tubular pivot projection, so that their own weight has no tendency to change their position. The main moving hand or index D is secured immovably to the rock-shaft $f$ by a screw-socket, $p$, screwed upon the screw-threaded end of the shaft, as shown, or by any equivalent means, and is also balanced thereon. Therefore, when the coil A expands or contracts, the movable end communicates its motion to the rock-shaft $f$, and consequently moves the arm $d$. The movements of this arm are shown by a curved graduated scale, H, marked with thermometric degrees. The scale H is mounted in a peculiar manner, whereby it can be attached or removed at will, and can be readily adjusted in position. For this purpose I employ a clamp-plate, I, Fig. 8, which is secured by a single screw to the standard, and is held in exact position by two projecting pins, r r, on the back side thereof, which enter holes in the standard. This clamp has lips s s on its clamping-edge, to embrace the edges of the scale, as shown, and not interfere with the reading of the degrees on the scale. The scale is entered into the clamp endwise, and slides therein with sufficient friction to retain it securely in the position to which it is adjusted. It can be withdrawn at any time for convenience in packing, or for any other purpose.

The connection between the operating or main hand or index D and the thermoscope-hands F G is peculiar. A pin or rod, t, projects backward from the hand D past and between the hands F G; and the latter two hands have semicircular or other suitably-formed notches u v, respectively, in the edges thereof next to the pin t, and in proper position to admit the said pin. By this construction the hands F and G can be brought exactly in line with the main hand D, so that the deviation of the heat and cold hands are very exactly indicated by the instrument, since they will be left by the main hand at the exact maxima and minima points.

The two hands F G may be respectively marked with the letters H and C, to indicate, without mistake, which is the maximum and which the minimum hand. These letters serve an additional purpose. They project laterally beyond the body of the hand, and are consequently wider than the main hand D, all the hands being ordinarily of about even width. By this means the two hands F G can, at any time, be brought directly behind the main hand without touching or disturbing the latter. Thus the letters H C serve a double purpose.

I claim as my invention—

1. In a thermoscope, the combination of the stand C, provided with oppositely-placed setscrews b b, radial arm B, pivoted to the stand at the rear side thereof on a pivot, a, coil A, mounted on a rearward lug or projection, e, of the said arm B, scale H, secured to the front side of the stand, and the hands D F G, mounted on the front side of the stand, substantially as herein specified.

2. The combination of the stand C, provided with the grooved sleeve projection k, the hands F G, the spring m, provided with the spline n, and the nut l, substantially as and for the purpose herein specified.

3. The combination of the main hand D, provided with the backwardly-extended pin t, and the hands F G, respectively provided with the notches u v, substantially as described, whereby the hands F G are adapted to be moved by the pin t of the hand D, and also to be brought directly back of the said hand D without interference by the said pin, as set forth.

4. The clamp-plate I, constructed substantially as described, in combination with the scale H, for the purpose specified.

In testimony whereof I have signed my name in the presence of two witnesses.

HENRY J. HAIGHT.

Witnesses:
EDWARD C. HAIGHT,
HENRY PEAKE.